United States Patent
Kim et al.

(10) Patent No.: US 11,625,092 B2
(45) Date of Patent: Apr. 11, 2023

(54) AUGMENTED REALITY SYSTEM AND METHOD OF GENERATING AUGMENTED REALITY

(71) Applicant: SAMSUNG ELECTRONICS CO., LTD., Suwon-si (KR)

(72) Inventors: Yuntae Kim, Suwon-si (KR); Jaehwan Pi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/321,984

(22) Filed: May 17, 2021

(65) Prior Publication Data

US 2022/0091664 A1  Mar. 24, 2022

(51) Int. Cl.
  *G06F 3/01* (2006.01)
  *G06T 7/73* (2017.01)
  *G06T 19/00* (2011.01)

(52) U.S. Cl.
  CPC .............. *G06F 3/012* (2013.01); *G06T 7/73* (2017.01); *G06T 19/006* (2013.01); *G06T 2207/10012* (2013.01)

(58) Field of Classification Search
  CPC .......... G06F 3/012; G06F 3/011; G06F 3/013; G06T 7/73; G06T 19/006; G06T 2207/10012; G06T 7/11; G06T 7/277; G06T 2207/30244; G06T 15/205
  See application file for complete search history.

(56) References Cited

U.S. PATENT DOCUMENTS

| | | |
|---|---|---|
| 2012/0243732 A1 | 9/2012 | Swaminathan et al. |
| 2013/0113827 A1 | 5/2013 | Forutanpour et al. |
| 2016/0140761 A1 | 5/2016 | Saunders et al. |
| 2017/0115488 A1 | 4/2017 | Ambrus et al. |
| 2017/0213388 A1* | 7/2017 | Margolis ............... G09G 3/007 |
| 2017/0330034 A1 | 11/2017 | Wang et al. |
| 2018/0275748 A1* | 9/2018 | Haraden ............... G06T 15/503 |
| 2020/0011668 A1 | 1/2020 | Derhy et al. |

FOREIGN PATENT DOCUMENTS

KR  10-2019-0106306 A  9/2019

OTHER PUBLICATIONS

Communication dated Jan. 14, 2022, issued by the European Patent Office in counterpart European Application No. 21185118.3.

* cited by examiner

*Primary Examiner* — Jeffery A Brier
(74) *Attorney, Agent, or Firm* — Sughrue Mion, PLLC

(57) ABSTRACT

A method of generating augmented reality includes obtaining external data, obtaining current pose data corresponding to a position of an augmented reality device, through edge computing, based on the obtained external data, obtaining first future pose data and second future pose data corresponding to movement of the augmented reality device, based on the obtained current pose data, generating a virtual image through the edge computing, based on the obtained first future pose data, and generating a virtual video, based on the obtained second future pose data and the generated virtual image.

20 Claims, 13 Drawing Sheets

AUGMENTED REALITY SYSTEM AND METHOD OF GENERATING AUGMENTED REALITY

CROSS-REFERENCE TO RELATED APPLICATION

This application is based on and claims priority under 35 U.S.C. § 119 to Korean Patent Application No. 10-2020-0121788, filed on Sep. 21, 2020, in the Korean Intellectual Property Office, the disclosure of which is incorporated by reference herein in its entirety.

BACKGROUND

1. Field

The disclosure relates to an augmented reality system and a method of generating augmented reality.

2. Description of Related Art

With recent technological developments, various types of wearable devices that can be worn on the human body have been developed. Among them, a glasses-type wearable device is worn on a user's head and may provide an augmented reality service to the user by displaying visual information about a virtual object on a display of the device.

According to display technologies such as augmented reality, an image output on a device may need to be perceived by a user as being real. Through such technologies, a user may experience various situations that cannot be experienced in real life. As a wearable device, an augmented reality device may need to be convenient for a user to wear. To this end, it may be necessary to reduce the size and weight of the augmented reality device. In addition, an image may have to be provided to a user through the augmented reality device in real time. When an output image is not displayed in real time, a user may feel uncomfortable due to an error caused by a difference between a detected pose and the output image. Accordingly, measures for achieving real-time image output while reducing the size and weight of an augmented reality device may be required.

SUMMARY

Provided are an augmented reality system and a method of generating augmented reality. In addition, provided is a computer-readable recording medium having recorded thereon a program for executing the method on a computer.

Additional aspects will be set forth in part in the description, which follows and, in part, will be apparent from the description, or may be learned by practice of the presented embodiments of the disclosure.

According to an aspect of an embodiment, a method of generating augmented reality includes obtaining external data, obtaining current pose data corresponding to a position of an augmented reality device, through edge computing, based on the obtained external data, obtaining first future pose data and second future pose data corresponding to movement of the augmented reality device, based on the obtained current pose data, generating a virtual image through the edge computing, based on the obtained first future pose data, and generating a virtual video, based on the obtained second future pose data and the generated virtual image.

The obtaining of the external data may include obtaining stereo data through a camera, and obtaining, through an inertial measurement portion, inertial data corresponding to the movement of the augmented reality device.

The obtaining of the current pose data may include extracting features of images around the augmented reality device, through the edge computing, based on the obtained external data, and generating optimization data by performing bundle adjustment or Kalman filtering on the extracted features.

The obtaining of the current pose data may further include obtaining the current pose data through the edge computing, based on the generated optimization data and map data that is received from a cloud.

The obtaining of the first future pose data and the second future pose data may include obtaining the first future pose data by applying the obtained inertial data to the obtained current pose data, and obtaining the second future pose data by changing 6 degrees of freedom (6D) poses included in the obtained first future pose data according to a preset parameter.

The obtaining of the first future pose data and the second future pose data may further include, based on the current pose data being obtained once, obtaining the first future pose data a plurality of times, by obtaining the first future pose data with a cycle faster than a cycle of obtaining the current pose data, and based on the first future pose data being obtained once, obtaining the second future pose data a plurality of times, by obtaining the second future pose data with a cycle faster than the cycle of obtaining the first future pose data.

The generating of the virtual image may include generating the virtual image by performing rendering on a graphic image that is received from a cloud, through the edge computing, based on the obtained first future pose data.

The generating of the virtual video may include generating a number of images corresponding to a number of times the second future pose data is obtained, by applying, to the virtual image, the second future pose data obtained a plurality of times, and generating the virtual video including the generated number of images.

According to an aspect of an embodiment, an augmented reality system includes a virtual image generating device, and an augmented reality device including an external data acquisition portion configured to obtain external data. The virtual image generating device is configured to obtain current pose data corresponding to a position of the augmented reality device, based on the obtained external data. The augmented reality device further includes a pose prediction portion configured to obtain first future pose data and second future pose data corresponding to movement of the augmented reality device, based on the obtained current pose data. The virtual image generating device is further configured to generate a virtual image, based on the obtained first future pose data. The augmented reality device further includes a virtual video generator configured to generate a virtual video, based on the obtained second future pose data and the generated virtual image.

The external data acquisition portion may include a camera configured to obtain stereo data, and an inertial measurement portion configured to obtain inertial data corresponding to the movement of the augmented reality device.

The virtual image generating device may be further configured to extract features of images around the augmented reality device, based on the obtained external data, and generate optimization data by performing bundle adjustment or Kalman filtering on the extracted features.

The virtual image generating device may be further configured to obtain the current pose data, based on the generated optimization data and map data that is received from a cloud.

The pose prediction portion may be further configured to obtain the first future pose data by applying the obtained inertial data to the obtained current pose data, and obtain the second future pose data by changing 6 degrees of freedom (6D) poses included in the obtained first future pose data according to a preset parameter.

The pose prediction portion may be further configured to, based on the current pose data being obtained once, obtain the first future pose data a plurality of times, by obtaining the first future pose data with a cycle faster than a cycle of obtaining the current pose data, and based on the first future pose data being obtained once, obtain the second future pose data a plurality of times, by obtaining the second future pose data with a cycle faster than the cycle of obtaining the first future pose data.

The virtual image generating device may be further configured to generate the virtual image by performing rendering on a graphic image received from a cloud, based on the obtained first future pose data.

The virtual video generator may be further configured to generate a number of images corresponding to a number of times the second future pose data is obtained, by applying, to the virtual image, the second future pose data obtained a plurality of times, and generate the virtual video including the generated number of images.

The virtual image generating device may be an edge computing device or a terminal capable of communication.

The pose prediction portion and the virtual video generator may be mounted on a chip included in the external data acquisition portion.

A computer-readable recording medium having recorded thereon a program for executing the method on a computer.

According to an aspect of an embodiment, a method of generating augmented reality is performed by at least one processor and includes obtaining stereo data from a camera, obtaining, from an inertial measurement portion, inertial data corresponding to a movement of an augmented reality device, obtaining current pose data corresponding to a position of the augmented reality device, based on the obtained stereo data and the obtained inertial data, obtaining first future pose data by applying the obtained inertial data to the obtained current pose data, obtaining second future pose data by changing 6 degrees of freedom (6D) poses included in the obtained first future pose data according to a preset parameter, generating a virtual image, based on the obtained first future pose data, and generating a virtual video, based on the obtained second future pose data and the generated virtual image.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
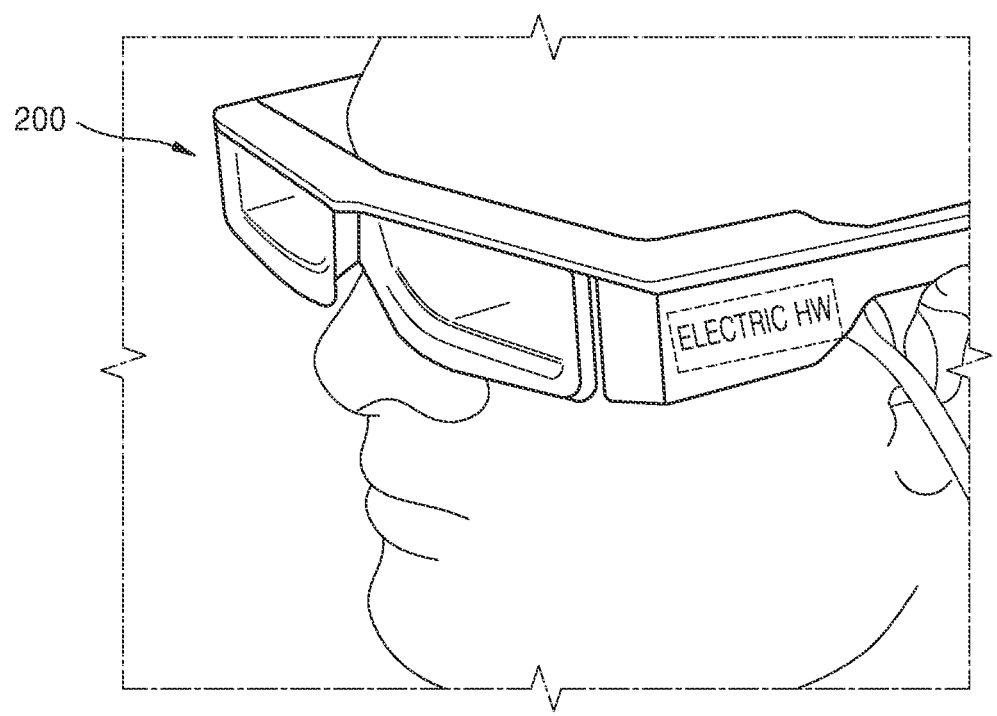
FIG. 1 is a diagram of an augmented reality device according to an embodiment.

Reference will now be made in detail to embodiments, examples of which are illustrated in the accompanying drawings, wherein like reference numerals refer to like elements throughout. In this regard, the present embodiments may have different forms and may not be construed as being limited to the descriptions set forth herein. Accordingly, the embodiments are described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the embodiments have been selected from currently widely used general terms in consideration of the functions in the disclosure. However, the terms may vary according to the intention of one of ordinary skill in the art, case precedents, and the advent of new technologies. Furthermore, for special cases, meanings of the terms selected by the applicant are described in detail in the description section. Accordingly, the terms used in the embodiments may be defined based on their meanings in relation to the contents discussed throughout the embodiments, not by their simple meanings.

In descriptions of the embodiments, when a part "connects" or "is connected" to another part, the part may connect or be connected to the other part not only directly, but also electrically through other elements interposed therebetween. Furthermore, when a part "includes" or "comprises" an element, unless specified otherwise, the part may further include other elements, not excluding the other elements.

The terms such as "consist of" or "include" used in the embodiments may not be construed to necessarily include all of various elements or steps disclosed herein. It may be construed that some elements or steps may not be included, and that additional elements or steps may further be included.

Furthermore, while the terms such as "first," "second," etc. may be used herein to describe various elements, the elements may not be limited by these terms. The terms are used only to distinguish one element from another.

The following descriptions of the embodiments may not be construed to limit the scope of the disclosure, and what can be easily inferred by one of ordinary skill in the art may be construed to belong to the scope of the disclosure. The embodiments are for example only and will be described in detail with reference to the accompanying drawings.

FIG. 1 is a diagram of an augmented reality device 200 according to an embodiment.

Referring to FIG. 1, the augmented reality device 200 may be a wearable device that is worn by a user. For example, the augmented reality device 200 may be a glasses-type wearable device, but the disclosure is not limited thereto and the augmented reality device 200 may be a wearable device of a different type to be worn on another body part of a user (for example, an augmented reality helmet).

The augmented reality device 200 may provide, through a display on the augmented reality device 200, an augmented reality service that fuses real world information around a user and a virtual video including digital or virtual object information. For example, when a virtual video is provided to a user through the augmented reality device 200, the virtual video may be provided together on a scene of the real world seen at a current position of the augmented reality device 200. While the user may see the virtual video through the augmented reality device 200, the virtual video does not exist in the real world.

The real world is a real scene that may be seen by an observer or a user through the augmented reality device 200 and may include a real world object. In comparison, the virtual video is a video generated by graphics processing and may correspond to a video displaying static images or a video displaying dynamic images. For example, the virtual video may be a video that is overlaid on a real scene to provide information about a real object in the real scene, or information or a control menu regarding the operation of the augmented reality device 200.

The augmented reality device 200 may correspond to a head-mounted wearable device, as illustrated in FIG. 1, and accordingly may move together when the head of a user moves. Therefore, as the position of the augmented reality device 200 may be continuously changed depending on the movement of the head of a user, it may be necessary that the location of the augmented reality device 200 is continuously updated in consideration of a change in the position of the head of a user. For example, when a user wearing the augmented reality device 200 walks on the road, a real world scene seen through the augmented reality device 200 is continuously changing. Accordingly, the virtual video provided by the augmented reality device 200 may be re-rendered in consideration of a current position so that a seamless perspective that the virtual video is present on the real world scene is provided to the user.

A partial inner space of the augmented reality device 200 may be provided with electric hardware (HW) including various types of sensors such as an inertial measurement unit (IMU) sensor, an accelerometer, or a compass, an image capture module such as a camera, a microphone, a GPS module, a communicator, a processor, or a battery.

The augmented reality device 200 may be further provided with an optical engine or an optical element to display the virtual video. Although FIG. 1 illustrates, for convenience of explanation, that the electric HW is provided in a frame at one side of the augmented reality device 200, the location of the electric HW in the augmented reality device 200 is not limited thereto and the electric HW may be provided at various locations on the augmented reality device 200 and each of hardware components may be provided in the same space or in different spaces.

Figure 2:
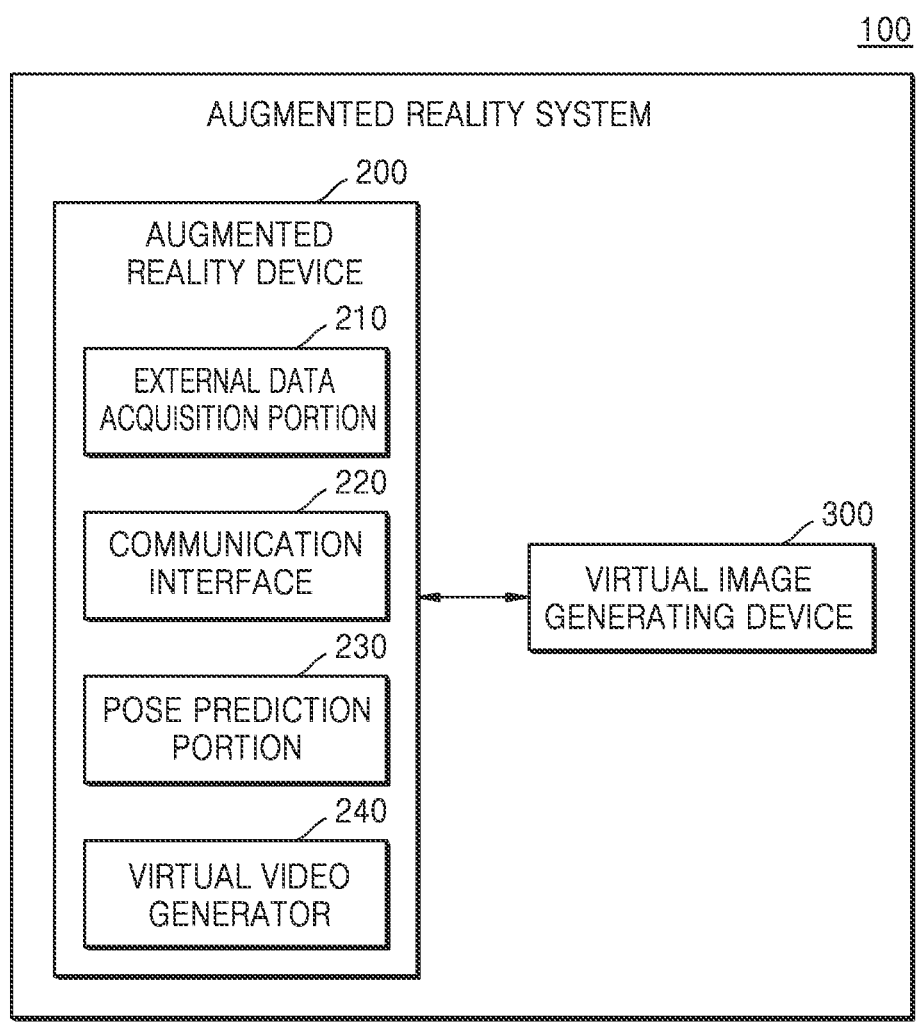
FIG. 2 is a block diagram of an augmented reality system according to an embodiment.

FIG. 2 is a block diagram of an augmented reality system 100 according to an embodiment.

Referring to FIG. 2, the augmented reality system 100 may include the augmented reality device 200 and a virtual image generating device 300. The augmented reality device 200 may include an external data acquisition portion 210, a communication interface 220, a pose prediction portion 230, and a virtual video generator 240.

In the augmented reality system 100 of FIG. 2, only components related to the present embodiments are illustrated. Accordingly, it will be obvious to one of ordinary skill in the art that the augmented reality system 100 may further include other general-purpose components in addition to the components illustrated in FIG. 2.

The virtual image generating device 300 is a device outside the augmented reality device 200 and may perform some of the processes for generating a virtual video. For example, in generating a virtual video, a process that may require a relatively small amount of computation (which may be processed at a relatively high speed) may be performed in the augmented reality device 200, and a process that may require a relatively large amount of computation (which may be processed at a relatively low speed) may be performed in the virtual image generating device 300. The virtual image generating device 300 may include a processor and a memory with a higher capacity or a higher performance compared to the augmented reality device 200. Accordingly, in the augmented reality system 100, processes that may require a relatively small amount of computation may be performed in the augmented reality device 200, and processes that may require a relatively large amount of computation may be performed in the virtual image generating device 300.

In the augmented reality system 100, among processes of generating a virtual video, only processes that may require a relatively small amount of computation are performed in the augmented reality device 200. As a result, the size, weight and power consumption of the augmented reality device 200 may be reduced compared to the case in which all processes are performed in the augmented reality device 200. Furthermore, in the augmented reality system 100, some processes for generating a virtual video (which may require a relatively small amount of computation) are still performed in the augmented reality device 200. As a result, the processes for generating a virtual video may be dualized and latency may be reduced compared to the case in which all processes are performed in the virtual image generating device 300. For example, the latency may correspond to the total time lapsed from when external data obtained until a virtual video is generated.

The external data acquisition portion 210 may obtain external data including data on an image outside the augmented reality device 200 or data on a movement of the augmented reality device 200. The external data acquisition portion 210 may transmit the external data to the communication interface 220 or to the pose prediction portion 230.

The communication interface 220 may transmit and receive data by communicating with the virtual image generating device 300. The communication interface 220 may transmit data received from the virtual image generating device 300 to each component of the augmented reality device 200, and may receive data from each component of the augmented reality device 200 and transmit the data to the virtual image generating device 300.

The communication interface 220 may include a hardware configuration that supports any one or any combination of communication standards and communication methods such as wireless fidelity (Wifi), Bluetooth (BT), near field communication (NFC), global positioning system (GPS), OFDM, orthogonal frequency division multiple access (OFDMA), LTE, LTE-A, code division multiple access (CDMA), wideband code division multiple access (WCDMA), universal mobile telecommunications system (UMTS), WiBro, global system for mobile communications (GSM), and fifth-generation (5G).

The pose prediction portion 230 may predict a future position of the augmented reality device 200. When a virtual video generated based on a current location of the augmented reality device 200 is output on a display, because the location of the augmented reality device 200 will have already changed while the virtual video is being generated, a difference between the real world and the virtual video may occur. Therefore, the pose prediction portion 230 may predict a future location of the augmented reality device 200 so that the virtual video may be provided based on the predicted future location of the augmented reality device 200.

The virtual video generator 240 may generate a virtual video provided to a user. The virtual video generator 240 may generate a virtual video corresponding to a future location of the augmented reality device 200 predicted by the pose prediction portion 230.

In an embodiment, operations of the pose prediction portion 230 and the virtual video generator 240 may be performed by processors included in each portion, or the operations of the pose prediction portion 230 and the virtual video generator 240 may both be performed by one processor. The processor may be implemented as an array of a plurality of logic gates, or may be implemented as a combination of a general-purpose microprocessor and a memory having recorded thereon a program executable in the microprocessor. In addition, it will be understood by one of ordinary skill in the art that the processor may be implemented with other types of hardware.

In embodiments, the pose prediction portion 230 and the virtual video generator 240 may be mounted in a chip included in the external data acquisition portion 210. For example, the chip may correspond to a sensor included in a camera, a sensor included in an inertial measurement portion, or an image sensor processor (ISP). The pose prediction portion 230 and the virtual video generator 240 may be designed in the form of a system on chip (SoC) and mounted in a chip. In this case, because various operations are performed on one chip, the size and weight of the augmented reality device 200 may be reduced, and the processes for generating a virtual video may be performed at high speed and low power.

The virtual image generating device 300 may obtain current pose data and the pose prediction portion 230 may obtain future pose data. The pose data is data including location information of the augmented reality device 200 and may include 6 degrees of freedom (6D) poses of the augmented reality device 200. The 6D poses may include 3D poses representing a position of the augmented reality device 200 and 3D poses representing an orientation of the augmented reality device 200.

Figure 3:
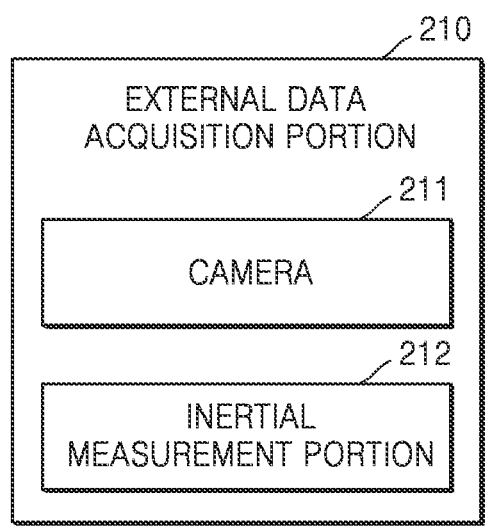
FIG. 3 is a block diagram of an external data acquisition portion according to an embodiment.

FIG. 3 is a block diagram of the external data acquisition portion 210 according to an embodiment.

Referring to FIG. 3, the external data acquisition portion 210 may include a camera 211 and an inertial measurement portion 212.

In the external data acquisition portion 210 of FIG. 3, only components related to the present embodiments are illustrated. Accordingly, it will be obvious to one of ordinary skill in the art that the external data acquisition portion 210 may further include other general-purpose components in addition to the components illustrated in FIG. 3.

The camera 211 may capture an image of an actual scene that a user can see through the augmented reality device 200. The external data acquisition portion 210 may obtain data about images outside the augmented reality device 200 through the camera 211. For example, when the external data acquisition portion 210 includes a plurality of cameras 211, stereo data may be obtained through the plurality of cameras 211. Alternatively, the external data acquisition portion 210 may obtain depth data of images outside the augmented reality device 200 through the camera 211. The camera 211 may be a black and white camera that captures a black and white image or a color camera that captures a color image.

The inertial measurement portion 212 may obtain inertial data corresponding to a movement of the augmented reality device 200. For example, the inertial measurement portion 212 may include an inertial measurement unit (IMU). The inertial measurement portion 212 may detect a movement of the augmented reality device 200 and generate inertial data based thereon. The inertial data may be used to predict a future position of the augmented reality device 200.

Figure 4:
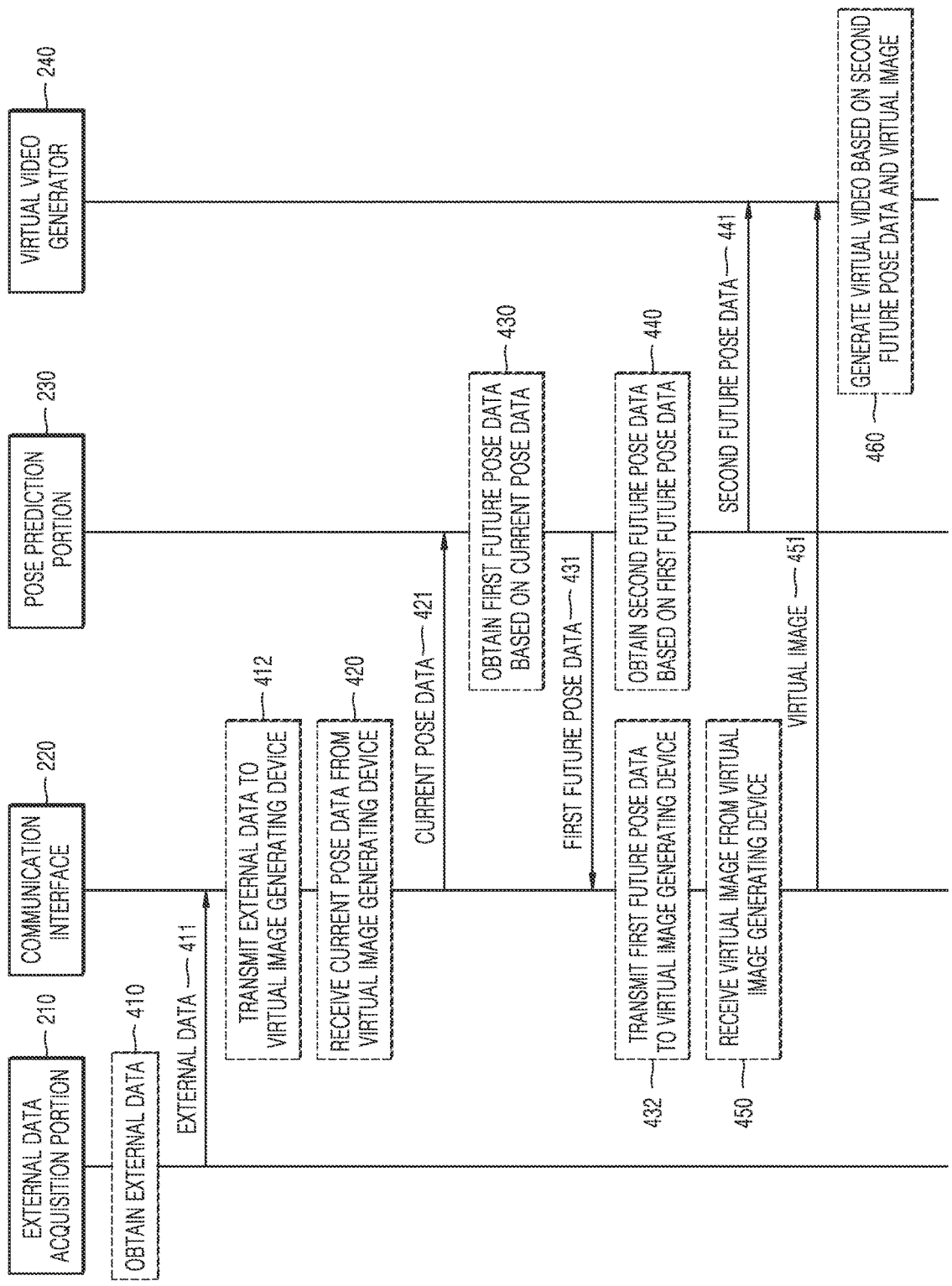
FIG. 4 is a flowchart of an operating method of an augmented reality device according to an embodiment.

FIG. 4 is a flowchart of an operating method of the augmented reality device 200, according to an embodiment.

Referring to FIG. 4, the operating method of the augmented reality device 200 may include operations that are processed in a time series in the augmented reality device 200 of FIG. 2. Accordingly, it will be understood that the contents described in relation to the augmented reality device 200 with reference to FIG. 2, even when omitted in the following description, may be applied to the method of FIG. 4.

In operation 410, the external data acquisition portion 210 may obtain external data.

The external data may include data about images outside the augmented reality device 200 or data about a movement of the augmented reality device 200.

In operation 411, the external data acquisition portion 210 may transmit the external data to the communication interface 220.

In operation 412, the communication interface 220 may transmit the external data to the virtual image generating device 300.

A method of obtaining current pose data based on the external data by the virtual image generating device 300 will be described in detail later with reference to FIG. 6.

In operation 420, the communication interface 220 may receive current pose data from the virtual image generating device 300.

The current pose data may be data corresponding to a current position of the augmented reality device 200.

In operation 421, the communication interface 220 may transmit the current pose data to the pose prediction portion 230.

In operation 430, the pose prediction portion 230 may obtain first future pose data based on the current pose data.

The pose prediction portion 230 may obtain the first future pose data by applying inertial data to the current pose data corresponding to the current position of the augmented reality device 200. Because the inertial data is obtained based on a movement of the augmented reality device 200, the first future pose data may include different 6D poses according to the movement of the augmented reality device 200.

The pose prediction portion 230 may obtain the first future pose data with a cycle faster than a cycle in which the current pose data is received (or in which the current pose data is obtained in the virtual image generating device 300). Accordingly, in the pose prediction portion 230, the first future pose data may be obtained a plurality of times when the current pose data is received once (or when the current pose data is obtained once in the virtual image generating device 300).

In operation 431, the pose prediction portion 230 may transmit the first future pose data to the communication interface 220.

In operation 432, the communication interface 220 may transmit the first future pose data to the virtual image generating device 300.

In operation 440, the pose prediction portion 230 may obtain second future pose data based on the first future pose data.

The second future pose data may correspond to a time point after a time point corresponding to the first future pose data. For example, when the first future pose data corresponds to a first time point after the current time point, the second future pose data may correspond to a second time point after the first time point.

The pose prediction portion 230 may obtain the second future pose data by changing 6D poses included in the first future pose data according to a preset parameter. The parameter is a criterion for changing six values of the 6D poses, and may be variously determined according to the setting of the augmented reality system 100. For example, an image corresponding to the second future pose data may be an image in which the position or shape of a virtual image corresponding to the first future pose data is slightly changed.

Compared to the first future pose data obtained based on the inertial data, the second future pose data obtained by changing the 6D poses of the first future pose data may take a shorter time to obtain. Accordingly, the pose prediction portion 230 may obtain the second future pose data with a cycle faster than a cycle of obtaining the first future pose data, and obtain the second future pose data a plurality of times when obtaining the first future pose data once.

In operation 441, the pose prediction portion 230 may transmit the second future pose data to the virtual video generator 240.

In operation 450, the communication interface 220 may receive a virtual image from the virtual image generating device 300.

The virtual image serves as a basis for images corresponding to each frame of the final output virtual video, and may correspond to a means for generating a virtual video rather than an output image.

In operation 451, the communication interface 220 may transmit the virtual image to the virtual video generator 240.

In operation 460, the virtual video generator 240 may generate a virtual video based on the second future pose data and the virtual image.

The virtual video generator 240 may apply the second future pose data obtained a plurality of times to the virtual image, thereby generating a number of images corresponding to the number of times the second future pose data is obtained. Because the virtual image is an image generated based on the first future pose data, the position or shape of the virtual image may be changed as the second future pose data is applied to the virtual image.

The virtual video generator 240 may generate a virtual video including a plurality of images generated by applying the second future pose data obtained a plurality of times to the virtual image. For example, each of the generated images may correspond to each frame of the virtual video composed of a plurality of frames.

The augmented reality system 100, by generating a virtual video corresponding to a future position of the augmented reality device 200 based on the current position of the augmented reality device 200, may provide a user with a video corresponding to the position of the augmented reality device 200 at the time point when the virtual video is displayed.

Figure 5:
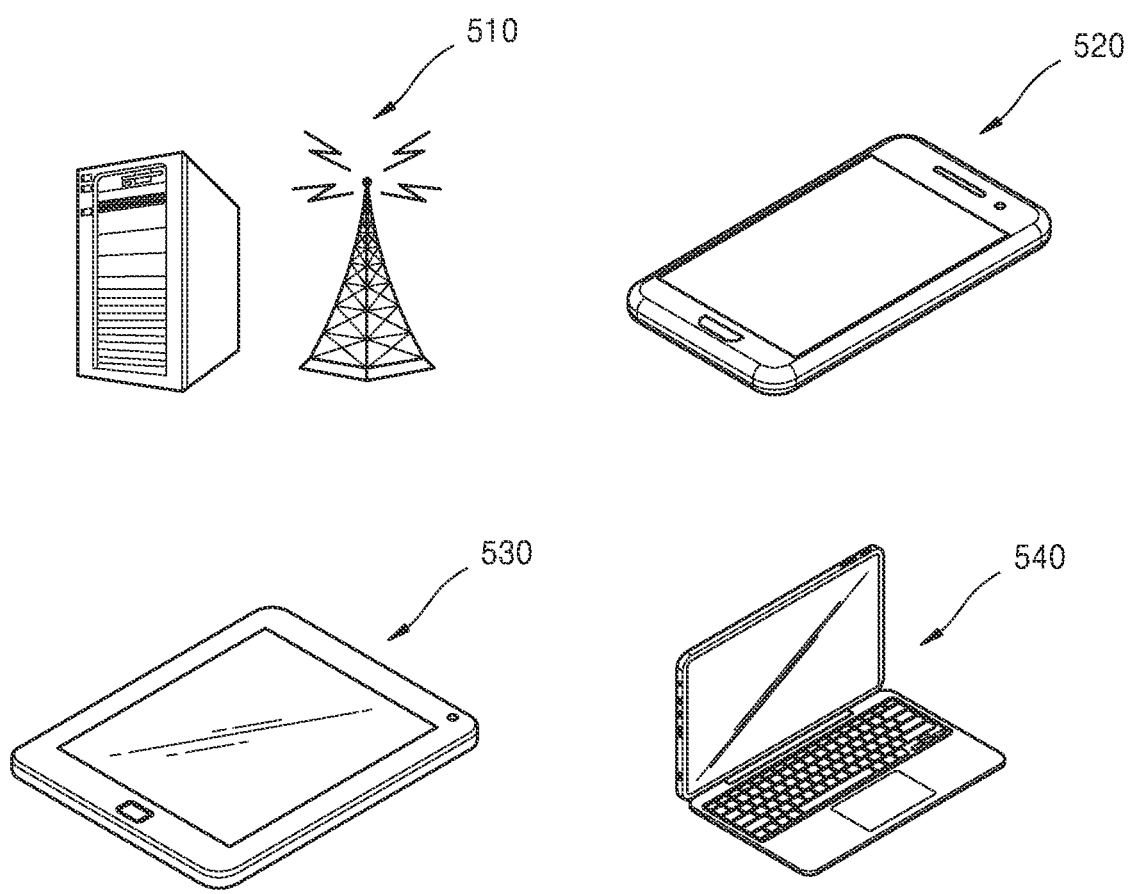
FIG. 5 is a diagram of types of a virtual image generating device according to an embodiment.

FIG. 5 is a diagram of types of the virtual image generating device 300 (of FIG. 2) according to an embodiment.

The virtual image generating device 300 is capable of communication and may correspond to any device, system, or server capable of rendering an image. For example, the virtual image generating device 300 may be a terminal capable of communication.

The virtual image generating device 300 may correspond to an edge computing device 510, or may correspond to a mobile phone or a smartphone 520. In addition, the virtual image generating device 300 may correspond to a tablet or a smart tablet 530, or may correspond to a computer or a laptop 540.

However, the virtual image generating device 300 according to FIG. 5 is only an example, and the type of the virtual image generating device 300 is not limited thereto.

Figure 6:
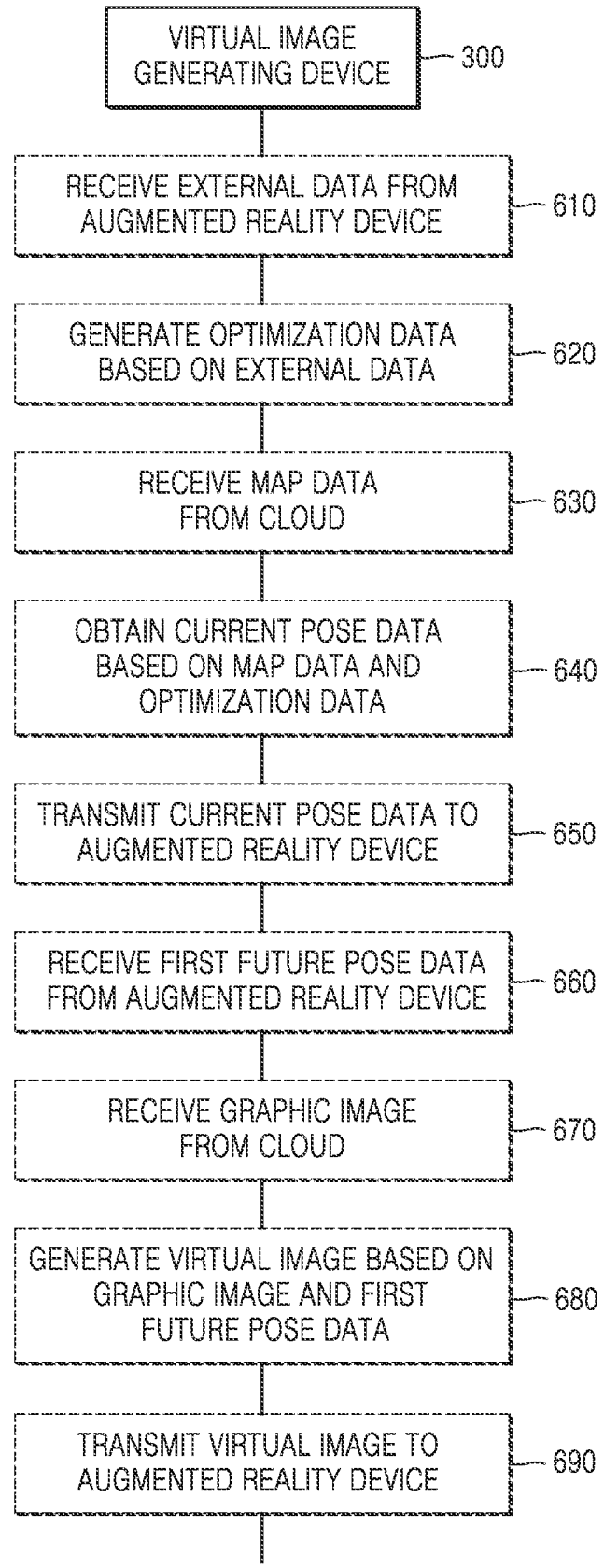
FIG. 6 is a flowchart of an operating method of a virtual image generating device according to an embodiment.

FIG. 6 is a flowchart of an operating method the virtual image generating device 300 according to an embodiment.

Referring to FIG. 6, the virtual image generating device 300 includes operations processed in a time series by the virtual image generating device 300 illustrated in FIG. 2. Accordingly, it will be understood that the contents described in relation to the virtual image generating device 300 with reference to FIG. 2, even when omitted in the following description, may be applied to the method of FIG. 6.

In operation 610, the virtual image generating device 300 may receive external data from the augmented reality device 200.

In operation 620, the virtual image generating device 300 may generate optimization data based on the external data.

The virtual image generating device 300 may extract features of images around the augmented reality device 200 based on the external data (for example, stereo data). The virtual image generating device 300 may generate optimization data by performing a bundle adjustment or a Kalman filtering on the features. The optimization data may correspond to data in which errors are reduced by performing filtering on the extracted features.

In operation 630, the virtual image generating device 300 may receive map data from a cloud.

The virtual image generating device 300 may receive data from the cloud by communicating with the cloud. The map data received from the cloud may correspond to data obtained by graphically representing an actual scene around the augmented reality device 200.

In operation 640, the virtual image generating device 300 may obtain current pose data based on the map data and the optimization data.

The optimization data may include data on a current position of the augmented reality device 200. However, the virtual image generating device 300 may utilize the map data in addition to the optimization data to obtain more accurate data on the current position of the augmented reality device 200.

The current pose data may include 6D poses corresponding to the current position of the augmented reality device 200.

In operation 650, the virtual image generating device 300 may transmit the current pose data to the augmented reality device 200.

In operation 660, the virtual image generating device 300 may receive first future pose data from the augmented reality device 200.

In operation 670, the virtual image generating device 300 may receive a graphic image from the cloud.

The graphic image does not include location information, and is an image that includes only the graphic of a virtual object included in a virtual image.

In operation 680, the virtual image generating device 300 may generate a virtual image based on the graphic image and the first future pose data.

The virtual image generating device 300 may generate the virtual image by performing rendering based on the first future pose data on the graphic image received from the cloud. The virtual image generating device 300 may input location information included in the first future pose data to the graphic image by performing rendering. The virtual image generating device 300 may generate a virtual image including graphics and location information.

In operation 690, the virtual image generating device 300 may transmit the virtual image to the augmented reality device 200.

Figure 7:
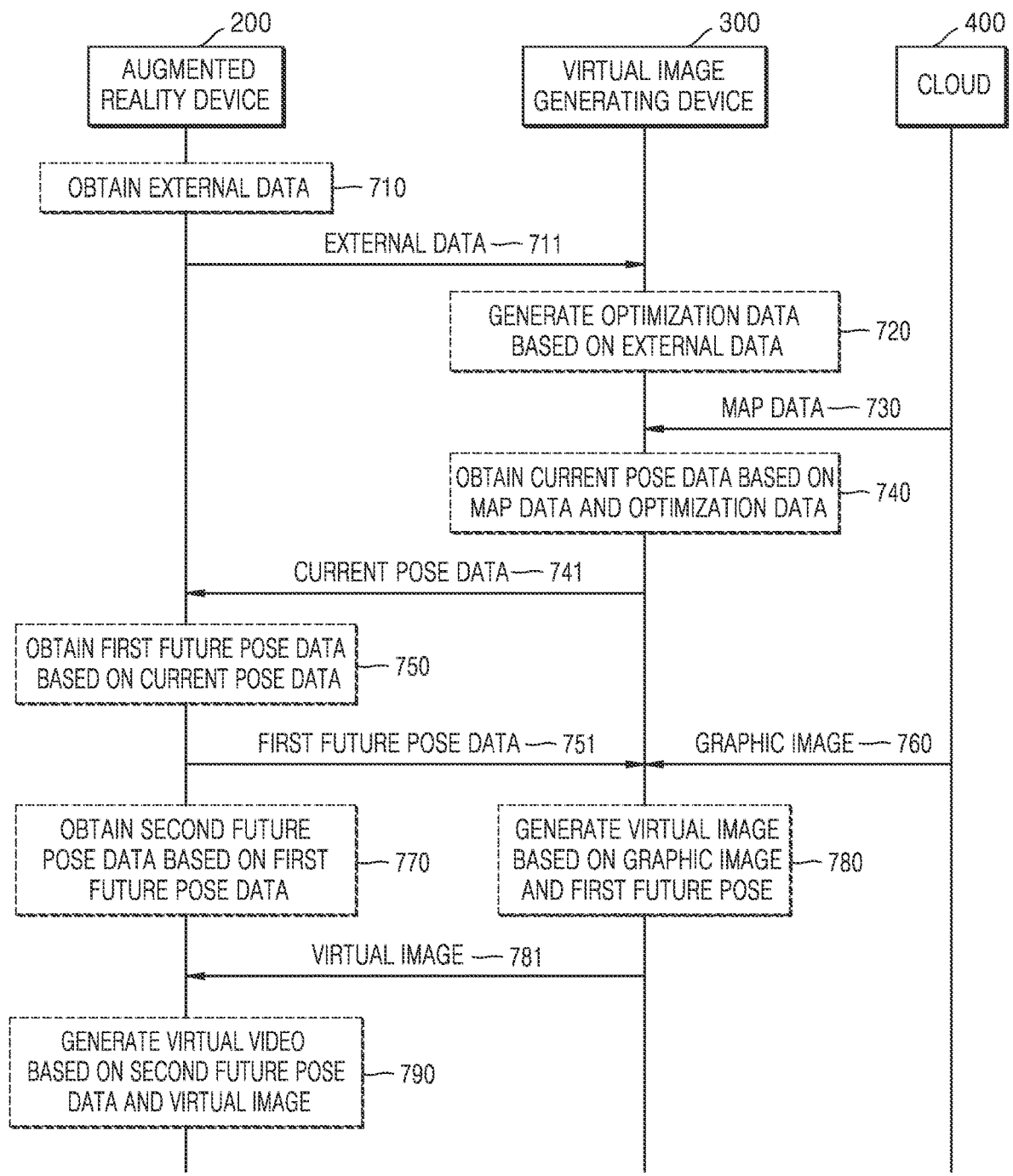
FIG. 7 is a flowchart of an operating method of an augmented reality device and a virtual image generating device according to an embodiment.

FIG. 7 is a flowchart of operating methods of the augmented reality device 200 and the virtual image generating device 300 according to an embodiment.

Referring to FIG. 7, the augmented reality system 100 includes operations processed in time series in the augmented reality system 100 of FIG. 2. Accordingly, it will be understood that the contents described in relation to the augmented reality system 100 with reference to FIG. 2, even when omitted in the following description, may be applied to the method of FIG. 7. In addition, the flowchart according to FIG. 7 is a flowchart in which the flowchart according to FIG. 5 is combined with the flowchart according to FIG. 6. Therefore, redundant descriptions are omitted.

In operation 710, the augmented reality device 200 may obtain external data.

The external data may include data about images outside the augmented reality device 200 or data about a movement of the augmented reality device 200.

In operation 711, the augmented reality device 200 may transmit the external data to the virtual image generating device 300.

In operation 720, the virtual image generating device 300 may generate optimization data based on the external data.

The optimization data may correspond to data in which errors are reduced by performing filtering on extracted features.

In operation 730, the virtual image generating device 300 may receive map data from a cloud 400.

The map data may correspond to data obtained by graphically representing an actual scene around the augmented reality device 200.

In operation 740, the virtual image generating device 300 may obtain current pose data based on the map data and the optimization data.

In operation 741, the virtual image generating device 300 may transmit the current pose data to the augmented reality device 200.

The current pose data may be data corresponding to a current location of the augmented reality device 200.

In operation 750, the augmented reality device 200 may obtain first future pose data based on the current pose data.

The first future pose data is data including a 6D pose of the augmented reality device 200, and may be data corresponding to a time point after the current time point.

In operation 751, the augmented reality device 200 may transmit the first future pose data to the virtual image generating device 300.

In operation 760, the virtual image generating device 300 may receive a graphic image from the cloud 400.

In operation 770, the augmented reality device 200 may obtain second future pose data based on the first future pose data.

The second future pose data may be data corresponding to a time point after a time point corresponding to the first future pose data.

In operation 780, the virtual image generating device 300 may generate a virtual image based on the graphic image and the first future pose data.

The virtual image may be an image that becomes the basis for images corresponding to each frame of a final output virtual video.

In operation 781, the virtual image generating device 300 may transmit the virtual image to the augmented reality device 200.

In operation 790, the augmented reality device 200 may generate a virtual video based on the second future pose data and the virtual image.

The virtual video may correspond to a video that includes digital or virtual object information and is provided to a user.

In the augmented reality system 100, among processes of generating a virtual video, only the operations of obtaining future pose data and generating a virtual video based on the virtual image, which may require a relatively small amount of computation, are performed in the augmented reality device 200. As a result, the size, weight, and power consumption of the augmented reality device 200 may be reduced compared to the case in which all processes are performed in the augmented reality device 200. At the same time, in the augmented reality system 100, not all processes of generating a virtual video are performed in the virtual image generating device 300, and only the operations of obtaining current pose data and generating a virtual image, which may require a relatively large amount of computation, are performed in the virtual image generating device 300. As a result, the processes of generating a virtual video may be dualized, and latency may be reduced compared to the case in which all processes are performed in the virtual image generating device 300.

By reducing latency, the augmented reality system 100 may generate a virtual video faster and more efficiently and provide the same to a user. Accordingly, the augmented reality system 100 may achieve size and weight reduction of the augmented reality device 200 that is a wearable device and, at the same time, provide to a user a seamless perspective that the virtual video is present on the real world scene.

Figure 8:
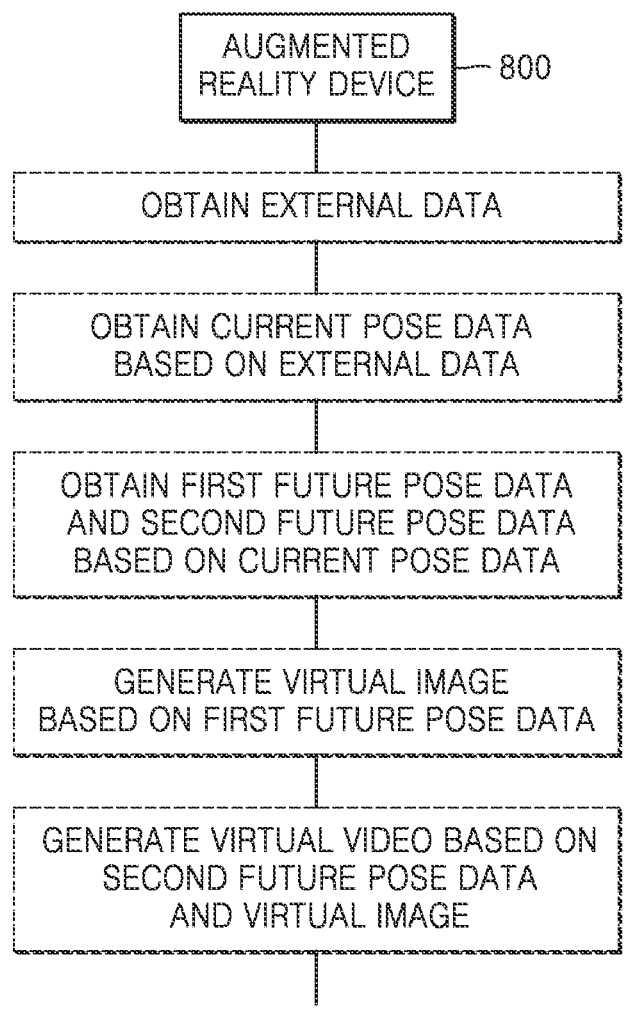
FIG. 8 is a flowchart illustrating a case in which all processes of generating a virtual video are performed in an augmented reality device.

FIG. 8 is a flowchart illustrating a case in which all processes of generating a virtual video are performed by an augmented reality device.

Referring to FIG. 8, unlike in the embodiment of FIG. 7, the operations of obtaining current pose data and generating a virtual image are also performed in an augmented reality device 800, and all operations are performed in the augmented reality device 800 without the intervention of the virtual image generating device 300.

In a method according to FIG. 8, because all operations are performed in the augmented reality device 800, a processor and a memory with higher capacity and higher performance may be required. Accordingly, the augmented reality device 800 of FIG. 8 may have greater size and weight compared to the augmented reality device 200 of FIG. 7. Because an augmented reality device is a wearable device, the above characteristics may cause inconvenience to a user.

However, the augmented reality system 100 of FIG. 7 may reduce the size and weight of the augmented reality device 200 by dualizing the process of generating a virtual video and provide convenience to a user.

Figure 9:
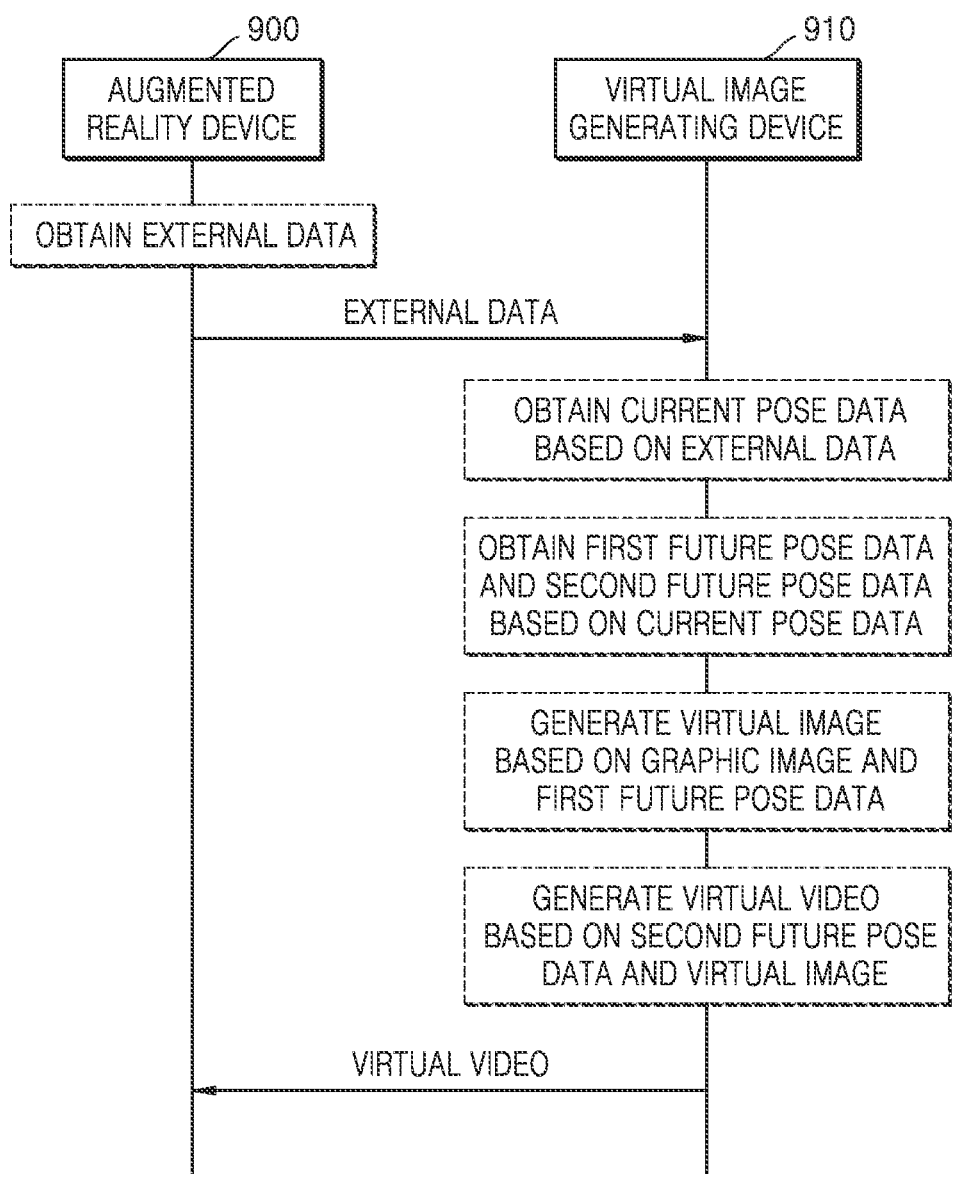
FIG. 9 is a flowchart illustrating a case in which all processes of generating a virtual video are performed in a virtual image generating device.

FIG. 9 is a flowchart illustrating a case in which all processes of generating a virtual video are performed by a virtual image generating device.

Referring to FIG. 9, unlike in the embodiment of FIG. 7, the operation of obtaining future pose data and the operation of generating a virtual video are also performed in a virtual image generating device 910, and all operations except for reception of external data are performed in the virtual image generating device 910 without the intervention of an augmented reality device 900.

In a method according to FIG. 9, because the virtual image generating device 910 performs all computations, the speed of generating a virtual image decreases compared to the case in which the computations are performed in a plurality of devices. In addition, it may take a longer time for the augmented reality device 900 to receive a generated virtual video. Accordingly, it takes a longer time to provide a user with a virtual video through an augmented reality system including the augmented reality device 900 and the virtual image generating device 910 of FIG. 9 compared to providing a user with a virtual video through the augmented reality system 100 of FIG. 7. Because an augmented reality system may have to display a virtual video in real-time, the above characteristics may cause a user to feel a sense of disparity or discrepancy between a real scene and the virtual video.

However, the augmented reality system 100 of FIG. 7 may increase the speed of generating a virtual video and reduce the overall latency by dualizing the process of generating the virtual video, thereby providing a user with a seamless perspective that the virtual video is present in the real world scene.

Figure 10:
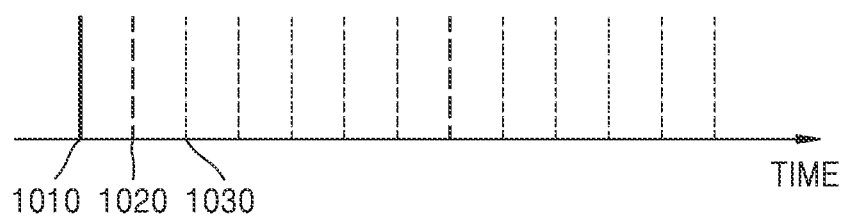
FIG. 10 is a diagram of current pose data and future pose data, according to an embodiment.

FIG. 10 is a diagram of current pose data and future pose data according to an embodiment.

Referring to FIG. 10, first future pose data 1020 is obtained a plurality of times when current pose data 1010 is obtained once, and second future pose data 1030 is obtained a plurality of times when first future pose data 1020 is obtained once.

To obtain the current pose data 1010, an operation of extracting and optimizing features of surrounding images based on the location of the augmented reality device 200 may be required, and thus, it may take a relatively long time to obtain the current pose data 1010. The first future pose data 1020 is obtained by applying inertial data to the current pose data 1010, and may take a relatively short time to obtain compared to the current pose data 1010. The second future pose data 1030 is obtained by applying a preset parameter to the first future pose data 1020 and may take a relatively short time to obtain compared to the first future pose data 1020.

Accordingly, in the augmented reality system 100, the number of times the current pose data 1010, the first future pose data 1020, and the second future pose data 1030 are obtained may be set differently to generate a virtual video in a fast and efficient way. However, the number of times each data is obtained as illustrated in FIG. 10 is only an example and may be set differently.

Figure 11:
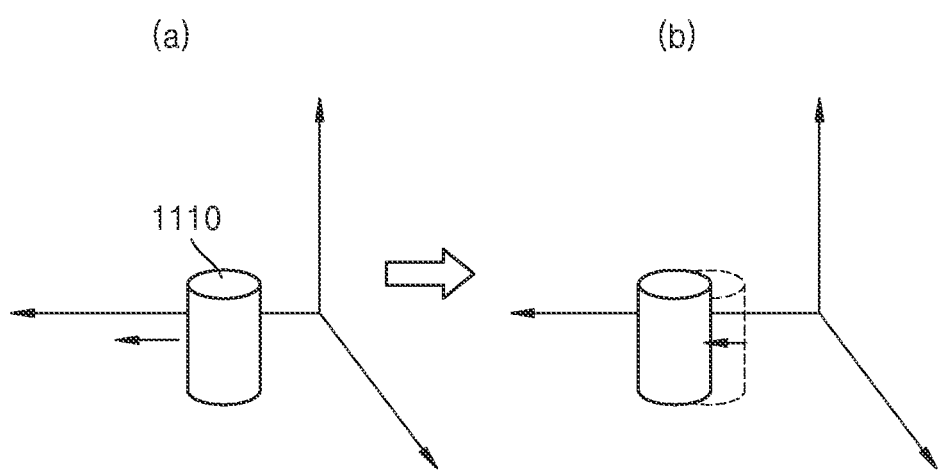
FIG. 11 is a diagram of a method of generating a virtual image according to an embodiment.

FIG. 11 is a diagram of a method of generating a virtual image according to an embodiment.

Referring to FIG. 11, a virtual object 1110 is displayed in a 3D space.

In portion (a) of FIG. 11, the virtual object 1110 is displayed to correspond to the current location of the augmented reality device 200. The augmented reality device 200 may be moved to the right based on portion (a) of FIG. 11. The augmented reality device 200 may obtain inertial data based on the movement to the right, and may obtain first future pose data 1020 based on the inertial data.

In this case, the virtual object 1110 may have to be moved to the left on the displayed screen. Accordingly, a virtual image rendered based on the first future pose data 1020 includes the virtual object 1110 moved to the left as illustrated in portion (b) of FIG. 11. The virtual image of portion (b) of FIG. 11 is an image including the virtual object 1110 and location information on the virtual object 1110.

Figure 12:
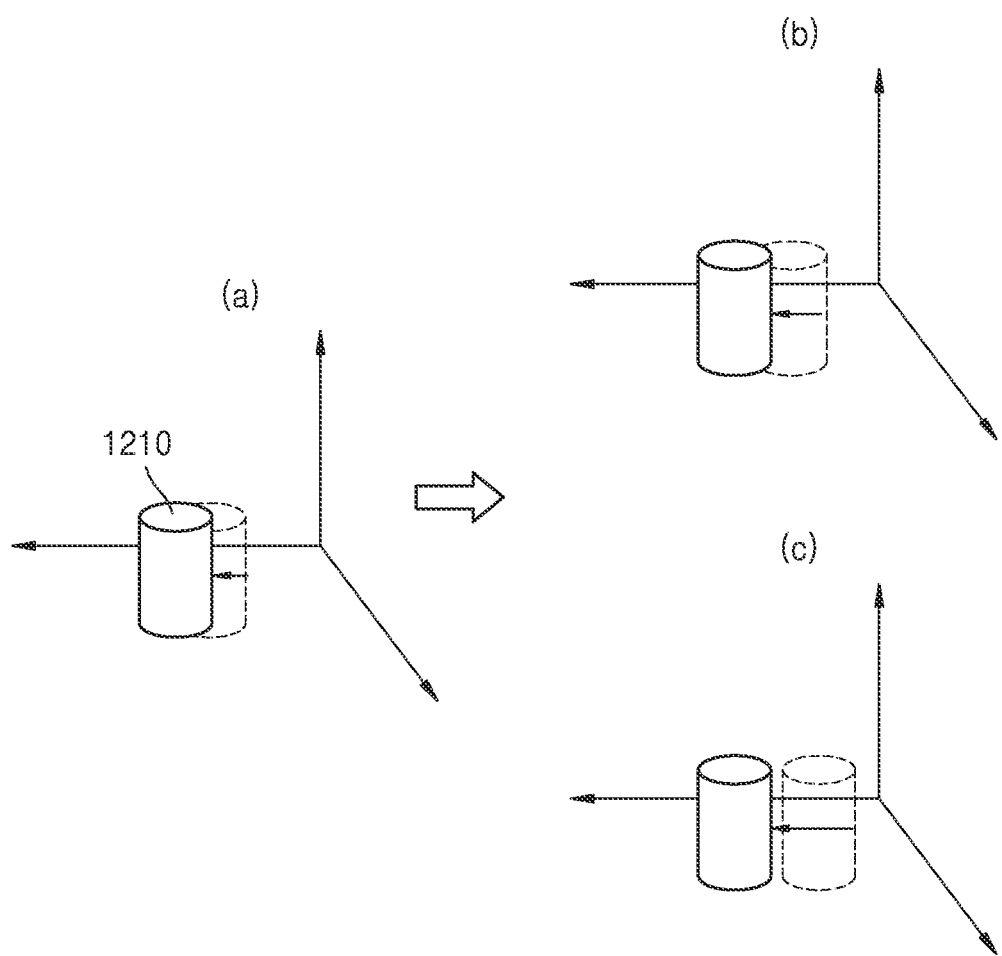
FIG. 12 is a diagram of a method of generating a virtual video according to an embodiment.

FIG. 12 is a diagram of a method of generating a virtual video according to an embodiment.

Referring to FIG. 12, a virtual object 1210 is displayed in a 3D space.

Portion (a) of FIG. 12 may correspond to portion (b) of FIG. 11. Portion (a) of FIG. 12 displays a virtual image rendered based on the first future pose data 1020.

The augmented reality device 200 may obtain the second future pose data 1030 a plurality of times by applying a preset parameter to the first future pose data 1020. The augmented reality device 200 may generate a plurality of images by applying the second future pose data 1030 obtained a plurality of times to the virtual image. The images generated by applying the second future pose data 1030 may be represented as in portions (b) and (c) of FIG. 12. As in the embodiment of FIG. 12, the augmented reality device 200 may generate a plurality of images for one virtual image, and may generate a virtual video including a plurality of images.

Figure 13:
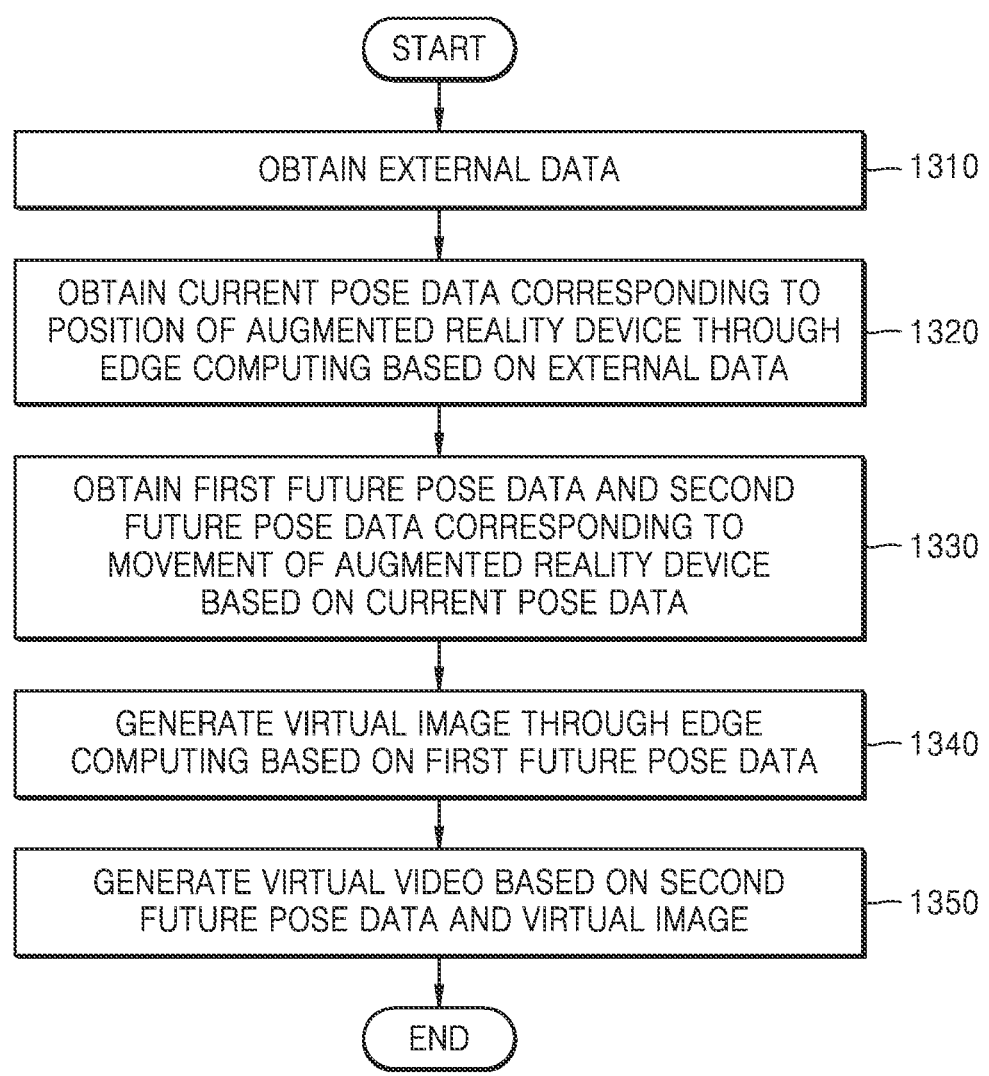
FIG. 13 is a flowchart of an operating method an augmented reality system according to an embodiment.

FIG. 13 is a flowchart of an operating method of an augmented reality system according to an embodiment.

Referring to FIG. 13, an augmented reality system 100 includes operations that are processed in time series by the augmented reality system 100 of FIG. 2. Accordingly, it will be understood that the contents described in relation to the augmented reality system 100 with reference to FIG. 2, even when omitted in the following description, may be applied to the method of FIG. 13. Therefore, redundant descriptions are omitted.

In operation 1310, the augmented reality system 100 may obtain external data.

The augmented reality system 100 may obtain stereo data through the camera 211 and obtain inertial data corresponding to a movement of the augmented reality device 200 through the inertial measurement portion 212.

In operation 1320, the augmented reality system 100 may obtain current pose data 1010 corresponding to a position of the augmented reality device 200 through edge computing based on the external data.

The augmented reality system 100 may extract features of images around the augmented reality device 200 through edge computing based on the external data.

The augmented reality system 100 may generate optimization data by performing a bundle adjustment or a Kalman filtering on the feature points through edge computing.

The augmented reality system 100 may obtain the current pose data 1010 through edge computing based on map data received from a cloud and the optimization data.

In operation 1330, the augmented reality system 100 may obtain first future pose data 1020 and second future pose data 1030 corresponding to a movement of the augmented reality device 200 based on the current pose data 1010.

The augmented reality system 100 may obtain the first future pose data 1020 by applying the inertial data to the current pose data 1010.

The augmented reality system 100 may obtain the second future pose data 1030 by changing 6D poses included in the first future pose data 1020 according to a preset parameter.

The augmented reality system 100 may obtain the first future pose data 1020 with a cycle faster than a cycle in which the current pose data 1010 is obtained, so that the first future pose data 1020 may be obtained a plurality of times when the current pose data 1010 is obtained once.

The augmented reality system 100 may obtain the second future pose data 1030 with a cycle faster than a cycle of obtaining the first future pose data 1020, so that the second future pose data 1030 may be obtained a plurality of times when obtaining the first future pose data 1020 once.

In operation 1340, the augmented reality system 100 may generate a virtual image through edge computing based on the first future pose data 1020.

The augmented reality system 100 may generate the virtual image by performing rendering on a graphic image received from the cloud through edge computing based on the first future pose data 1020.

In operation 1350, the augmented reality system 100 may generate a virtual video based on the second future pose data 1030 and the virtual image.

The augmented reality system 100 may apply the second future pose data 1030 obtained a plurality of times to the virtual image, thereby generating a number of images corresponding to the number of times the second future pose data 1030 is obtained.

The augmented reality system 100 may generate a virtual video including the number of images corresponding to the number of times the second future pose data 1030 is obtained.

The operating methods of FIGS. 4, 6, 7 and 13 may be recorded in a computer-readable recording medium having recorded thereon at least one program including instructions for executing the methods. Examples of the computer-readable recording medium may include: magnetic media such as hard disks, floppy disks, and magnetic tapes; optical media such as CD-ROMs and DVDs; magneto-optical media such as floptical disks; and hardware devices configured to store and execute program instructions such as ROM, RAM, flash memory, and the like. Examples of the program instructions may include not only machine language codes such as those produced by a compiler, but also high-level language codes that can be executed by a computer using an interpreter or the like.

It may be understood that embodiments described herein may be considered in a descriptive sense only and not for purposes of limitation. Descriptions of features or aspects within each embodiment may be considered as available for other similar features or aspects in other embodiments. While embodiments have been described with reference to the figures, it will be understood by one of ordinary skill in the art that various changes in form and details may be made therein without departing from the spirit and scope as defined by the following claims.

What is claimed is:

1. A method of generating augmented reality, the method comprising:
    obtaining external data;
    obtaining current pose data corresponding to a position of an augmented reality device, through edge computing, based on the obtained external data;
    obtaining first future pose data and second future pose data corresponding to movement of the augmented reality device, based on the obtained current pose data;
    generating a virtual image through the edge computing, based on the obtained first future pose data; and
    generating a virtual video, based on the obtained second future pose data and the generated virtual image.

2. The method of claim 1, wherein the obtaining of the external data comprises:
    obtaining stereo data through a camera; and
    obtaining, through an inertial measurement portion, inertial data corresponding to the movement of the augmented reality device.

3. The method of claim 2, wherein the obtaining of the first future pose data and the second future pose data comprises:
    obtaining the first future pose data by applying the obtained inertial data to the obtained current pose data; and
    obtaining the second future pose data by changing 6 degrees of freedom (6D) poses included in the obtained first future pose data according to a preset parameter.

4. The method of claim 3, wherein the obtaining of the first future pose data and the second future pose data further comprises:
    based on the current pose data being obtained once, obtaining the first future pose data a plurality of times, by obtaining the first future pose data with a cycle faster than a cycle of obtaining the current pose data; and
    based on the first future pose data being obtained once, obtaining the second future pose data a plurality of times, by obtaining the second future pose data with a cycle faster than the cycle of obtaining the first future pose data.

5. The method of claim 4, wherein the generating of the virtual video comprises:
    generating a number of images corresponding to a number of times the second future pose data is obtained, by applying, to the virtual image, the second future pose data obtained a plurality of times; and
    generating the virtual video comprising the generated number of images.

6. The method of claim 1, wherein the obtaining of the current pose data comprises:
    extracting features of images around the augmented reality device, through the edge computing, based on the obtained external data; and
    generating optimization data by performing bundle adjustment or Kalman filtering on the extracted features.

7. The method of claim 6, wherein the obtaining of the current pose data further comprises obtaining the current pose data through the edge computing, based on the generated optimization data and map data that is received from a cloud.

8. The method of claim 1, wherein the generating of the virtual image comprises generating the virtual image by performing rendering on a graphic image that is received from a cloud, through the edge computing, based on the obtained first future pose data.

9. A non-transitory computer-readable recording medium having recorded thereon a program for executing the method of claim 1 on a computer.

10. An augmented reality system comprising:
an augmented reality device comprising:
a first memory storing one or more first instructions; and
a first processor configured to execute the one or more first instructions to obtain external data,
a virtual image generating device comprising:
a second memory storing one or more second instructions; and
a second processor configured to execute the one or more second instructions to obtain current pose data corresponding to a position of the augmented reality device, based on the obtained external data,
wherein the first processor of the augmented reality device is further configured to obtain first future pose data and second future pose data corresponding to movement of the augmented reality device, based on the obtained current pose data,
wherein the second processor of the virtual image generating device is further configured to generate a virtual image, based on the obtained first future pose data, and
wherein the first processor of the augmented reality device is further configured to generate a virtual video, based on the obtained second future pose data and the generated virtual image.

11. The augmented reality system of claim 10, wherein the augmented reality device further comprises:
a camera; and
an inertial measurement unit (IMU) sensor,
wherein the first processor is further configured to:
obtain stereo data from the camera; and
obtain inertial data corresponding to a movement of an augmented reality device from the IMU sensor.

12. The augmented reality system of claim 11, wherein the first processor of the augmented reality device is further configured to:
obtain the first future pose data by applying the obtained inertial data to the obtained current pose data; and
obtain the second future pose data by changing 6 degrees of freedom (6D) poses included in the obtained first future pose data according to a preset parameter.

13. The augmented reality system of claim 12, wherein the first processor of the augmented reality device is further configured to:
based on the current pose data being obtained once, obtain the first future pose data a plurality of times, by obtaining the first future pose data with a cycle faster than a cycle of obtaining the current pose data; and
based on the first future pose data being obtained once, obtain the second future pose data a plurality of times, by obtaining the second future pose data with a cycle faster than the cycle of obtaining the first future pose data.

14. The augmented reality system of claim 13, wherein the second processor of the virtual video generator is further configured to:
generate a number of images corresponding to a number of times the second future pose data is obtained, by applying, to the virtual image, the second future pose data obtained a plurality of times; and
generate the virtual video comprising the generated number of images.

15. The augmented reality system of claim 11, wherein the first processor of the augmented reality device is mounted on a chip including the camera and the IMU sensor.

16. The augmented reality system of claim 10, wherein the second processor of the virtual image generating device is further configured to:
extract features of images around the augmented reality device, based on the obtained external data; and
generate optimization data by performing bundle adjustment or Kalman filtering on the extracted features.

17. The augmented reality system of claim 16, wherein the second processor of the virtual image generating device is further configured to obtain the current pose data, based on the generated optimization data and map data that is received from a cloud.

18. The augmented reality system of claim 10, wherein the second processor of the virtual image generating device is further configured to generate the virtual image by performing rendering on a graphic image received from a cloud, based on the obtained first future pose data.

19. The augmented reality system of claim 10, wherein the second processor of the virtual image generating device is an edge computing device or a terminal capable of communication.

20. A method of generating augmented reality, the method being performed by at least one processor, and the method comprising:
obtaining stereo data from a camera;
obtaining, from an inertial measurement portion, inertial data corresponding to a movement of an augmented reality device;
obtaining current pose data corresponding to a position of the augmented reality device, based on the obtained stereo data and the obtained inertial data;
obtaining first future pose data by applying the obtained inertial data to the obtained current pose data;
obtaining second future pose data by changing 6 degrees of freedom (6D) poses included in the obtained first future pose data according to a preset parameter;
generating a virtual image, based on the obtained first future pose data; and
generating a virtual video, based on the obtained second future pose data and the generated virtual image.

* * * * *